Oct. 23, 1962     F. D. CARPENTER     3,060,119

SEA-WELL CONVERSION OF SALT WATER

Filed May 16, 1962

INVENTOR.
FREDERICK D. CARPENTER

BY

United States Patent Office 3,060,119
Patented Oct. 23, 1962

3,060,119
SEA-WELL CONVERSION OF SALT WATER
Frederick D. Carpenter, 6743 Eldridge, San Diego, Calif.
Filed May 16, 1962, Ser. No. 196,849
9 Claims. (Cl. 210—22)
(Granted under Title 35, U.S. Code (1952), sec. 266)

The invention described herein may be manufactured and used by or for the Government of the United States of America for governmental purposes without the payment of any royalties thereon or therefor.

This invention relates to processes for purifying saline solutions, but more specifically, to provide a simple apparatus for separating pure water from sea water.

The present invention is a continuation-in-part of copending application Serial No. 836,042, filed August 25, 1959, Sea-Well Conversion of Salt Water.

The basic problem of producing fresh water from the sea for commercial purposes is growing more important each day. One phase of the conversion problem is to produce pure water for drinking and especially in the case of shipwrecked victims at sea. Various methods such as distillation, the utilization of solar or combustion energy, and deionization by chemical or electrical means are commonly followed. The complication of performance and lack of reliability when employed on a small scale, has hindered the development and improvement of the aforesaid processes.

The proposed method is so simple that lack of experience does not hinder its use or practice. Basically, when an animal membrane separates an aqueous solution from water, the membrane will permit the water to pass while blocking the counter-flow of the solute. Such a theory is known as osmosis. However, for all practical purposes the reversal of the process is necessary if we are to extract pure water from a salt solution.

The flow of water through the membrane can be retarded by applying pressure to the solution. The pressure at which flow stops is the osmotic pressure. If the pressure is decreased water will again begin to flow. If the pressure of the solution is increased by an incremental amount, a reverse flow of water will occur from the salt solution to the pure water side. The term reverse osmosis is used to describe this process.

The general object of this invention is to provide a simple, manually operated apparatus for performing the process of reverse osmosis.

Another object is to provide a water purifier of elementary construction operating on the theory of reverse osmosis by applying a high natural hydrostatic pressure.

Still another object is to provide a hollow container having an interstitial lattice structure such as glass, physically ably to withstand hydrostatic pressures in excess of four hundred pounds per square inch whereby salt water purification will result.

Another object is to provide a hollow laminated container comprising ion exchange resin layers between porous, high compressive strength shells for submergence at great depths in the sea whereby pure water is collected in the hollow container as a result of reverse osmosis.

In other words, one of the objects is to provide a method for purifying sea water by employing the ocean pressure as a step in the operation.

A final object is the provision of simple means for removing said pure water from the containers, periodically whereby shipwrecked victims can readily obtain potable water at sea.

Other objects and many of the attendant advantages of this invention will be readily appreciated as the same becomes better understood by reference to the following detailed description when considered in connection with the accompanying drawings wherein.

Figure 1:
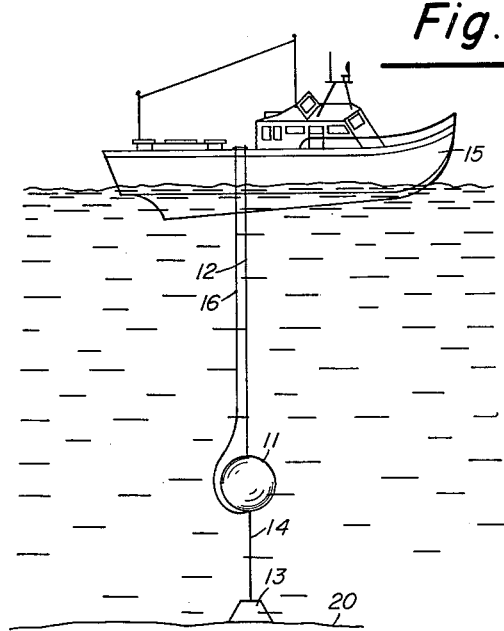
FIG. 1 illustrates diagrammatically the sea-well at the bottom of the ocean as controlled from a surface ship.

In detail, the simplest form of structure for practicing the invention is illustrated diagrammatically in FIG. 1. A spherical sea-well 11 has been lowered by means of the line 12 from a ship 15. The hollow sphere 11 whose internal pressure is atmospheric, is submerged by weight 13 to a distance above the ocean floor equivalent to the length of the anchor cable 14. The length of the line 12, or, in other words, the depth to which the sea-well 11 is submerged, must be greater than 827 feet in order to subject the sea-well to a hydrostatic pressure of 360 pounds per square inch or higher.

Figure 2:
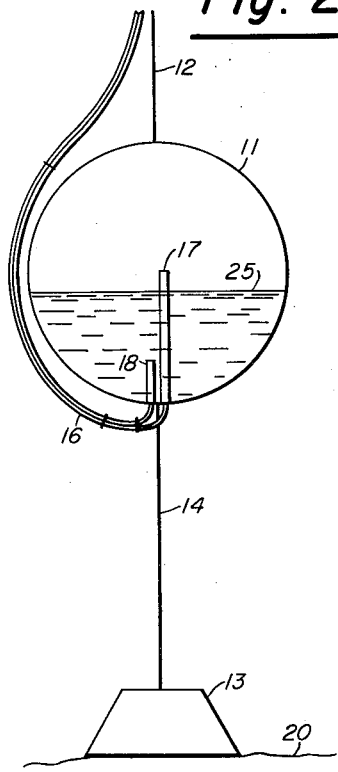
FIG. 2 shows an enlarged view of the sea-well with extraction hoses connected.
Figure 3:
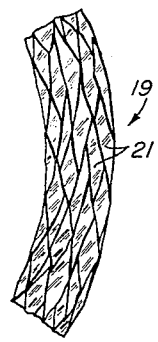
FIG. 3 is an enlarged section of a spherical, glass sea-well showing the interstitial lattice structure.

The sea-well in its elemental form, namely a single walled, uniform glass sphere as illustrated in FIGS. 1 to 3, has demonstrated the process as a practical means for purifying sea water. By maintaining the anchor cable 14, long enough to allow the sphere 11 to be suspended approximately ten feet or more above the ocean bottom 20, the sea-well 11 will be subjected to the wiping action of the ocean currents. Due to said ocean currents, ions, and other foreign substances which would normally collect on the surface of the sea-well, will be washed off.

As a result of the difference between the sea water hydrostatic pressure on the external surface of sphere 11, and atmospheric pressure internally, the sea water will be filtered through the interstitial lattice structure 21 by means of reverse osmosis, thereby producing purified water inside the sea-well 11.

The method for extracting the purified water from the sea-well may, or may not, be important, according to the size and type of application. Commercial purification units of considerable size may be operated from a shore station in which case fields of sea-wells depending on capacity of water needed would be anchored some distance off shore where the ocean depth is greater than the 827 feet, above mentioned. In that case, the pressure and extraction hoses 16 would extend from the base of the sea-well 11 to the pumping station. When the sea-well 11 is partially filled to say the level 25, FIG. 2, a compressor forces air under pressure through the line 16 and out the air pressure nozzle 17. As the pressure builds up internally in the sea-well 11 the purified water is forced out through the outlet 18 and line 16 to a collecting tank at the pumping station. After the purified water is completely removed, the internal pressure is permitted to return to atmospheric and the process can be repeated.

In case of shipwreck, the sea-well water can be extracted simply by hauling in the device and pouring the potable water out of the well into a receptacle. In large installations of a commercial nature, pressure and drain hose are connected between the land station and sea-well for ready extraction of purified water.

In the above described apparatus, a sea-well made of ordinary glass and having a spherical shape, is the preferred form of osmotic member. The spherical shape provides the inherent natural structural strength required to withstand the required 360 pounds per square inch of external hydrostatic pressure. Such a shape permits the use of a thinner wall structure whereby the water will more readily penetrate through the interstices of the lattice structure.

The term ordinary glass as employed in the preferred form of this invention is often referred to as common glass, window glass or soda lime glass as to composition. It is the substance obtained from mixing inorganic materials and melting them together at a high temperature. The resulting hot liquid, when cooled, becomes rigid without crystallizing—that is, its molecules never arrange themselves into a tight crystalline pattern but are in a multiple platelet arrangement to form an interstitial lattice structure as illustrated in FIG. 3.

Soda lime glasses used for lamp envelopes, bottles, and window glass are melted from silica that has been fluxed with lime (CaO), and soda (Na$_2$O) plus small quantities of other oxides. A typical lime glass composition is approximately as follows:

| | Percent |
|---|---|
| Silica, SiO$_2$ | 72 |
| Soda, Na$_2$O | 15 |
| Lime, CaO | 9 |
| Magnesia, MgO | 3 |
| Alumina, Al$_2$O$_3$ | 1 |

The low melting temperature of soda lime glasses (725° C. or less) as compared with high 96% silica glasses which melt at 1500° C., is evidence of the former's utility in this invention employing the simplest type of apparatus.

Lime glasses are low in cost, easily hot-worked and are usually specified for service where high heat resistance and chemical stability are not required. It is well suited for use in the construction of hollow glass spheres employed herein. It is one of the most economical sea wells to produce, for use in performing the method for extracting pure water from sea water.

Figure 4:
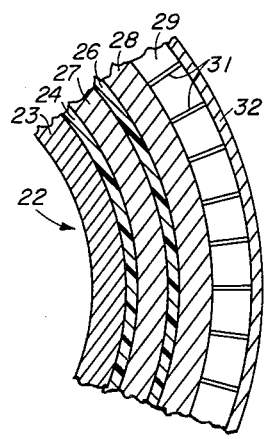
FIG. 4 is a cross section of a laminated sea-well shell employing osmotic membranes and structure layers for strength.

However, osmotic membranes such as cellulose acetate may be used but require structural supporting members to make it possible for the sea-well to withstand the high external pressure from the ocean depths. Such a laminated structure is illustrated in FIG. 4 wherein the osmotic membranes 24 and 26 are positioned between the porous compressive strength members 23, 27 and 28. A porous metal outer layer 32 is designed for excluding algae and other foreign substances, and is shown supported on a ribbed structure 31 to provide a space 29 and supporting member for the porous shell 32.

Various modifications are contemplated and may obviously be resorted to by those skilled in the art without departing from the spirit and scope of the invention, as hereinafter defined by the appended claims, as only a preferred embodiment thereof has been disclosed.

What is claimed is:

1. A method for extracting pure water from sea water comprising the step of forming of a hollow body containing an osmotic membrane as an integral portion of the body wall, submerging said body in the ocean to a depth of at least 827 feet so that the differential pressure between the interior and exterior of the body will exceed the osmotic pressure of sea water, using the ocean pressure in the process of reverse osmosis so that pure water will be forced through said body wall membrane, and finally extracting the purified water from the interior of the body.

2. A method for extracting pure water from sea water comprising the step of forming a hollow body of glass having an interstitial lattice structure, submerging said body in the ocean to a depth of at least 827 feet so that the differential pressure between the interior and exterior of the body will exceed the osmotic pressure of sea water, using the ocean pressure in the process of reverse osmosis so that pure water will be forced through said body wall membrane, and finally extracting the purified water from the interior of the body.

3. A method for extracting pure water from sea water comprising the steps of submerging a hollow body containing an osmotic membrane as an integral portion of the body wall, in the ocean to a depth of at least 827 feet so that the differential pressure between the interior and exterior of said body will exceed the osmotic pressure of sea water, retaining the body at this depth for a suitable period of time so that the ocean pressure against the membrane being higher than said osmotic pressure will force pure water through the membrane into the interior of the hollow body, and finally remove the pure water from said body.

4. A method as set forth in claim 3 wherein the osmotic membrane is made of ordinary glass.

5. A method as set forth in claim 4 wherein the composition of said glass is approximately

| | Percent |
|---|---|
| Silica, SiO$_2$ | 72 |
| Soda, Na$_2$O | 15 |
| Lime, CaO | 9 |
| Magnesia, MgO | 3 |
| Alumina, Al$_2$O$_3$ | 1 |

6. A method as set forth in claim 3 wherein said hollow body is spherical in shape and made of ordinary glass.

7. A method as set forth in claim 3 wherein said hollow body wall is a laminated structure consisting of one or more osmotic membranes such as cellulose acetate supported by one or more porous compressive strength members.

8. A method for extracting pure water from sea water comprising the steps of forming a hollow body of ordinary glass capable of withstanding a hydrostatic pressure of 360 pounds per square inch or over, submerging said body in the ocean to a depth of at least 827 feet, employing the ocean pressure to separate pure water from the salt solution by reverse osmosis and force the potable water through said body walls by osmotic pressure into the interior of said body, and finally removing the pure water from said body.

9. A method for extracting pure water from sea water for emergency supply of shipwrecked victims at sea comprising the steps of forming an osmotic membrane in the shape of a spherical body said body being made of common glass and capable of withstanding a hydrostatic pressure in excess of 360 pounds per square inch, submerging said body to a minimum depth of at least 827 feet in the ocean, maintaining said body clear of the ocean bottom and washing its surface with the ocean currents to remove any foreign matter accumulated on said body's external surface, use the ocean pressure to exert a differential pressure between the interior and exterior of said body greater than the osmotic pressure of sea water and finally extracting the purified water forced into the body by reverse osmosis.

References Cited in the file of this patent

UNITED STATES PATENTS

| 42,073 | Cannon | Mar. 29, 1864 |
| 154,158 | Spooner | Aug. 18, 1874 |
| 2,861,038 | Steinmann et al. | Nov. 18, 1958 |
| 2,892,508 | Kohman et al. | June 30, 1959 |
| 2,930,754 | Stuckey | Mar. 29, 1960 |

OTHER REFERENCES

Murphy: Progress Report No. 9, "Minimum Energy Requirements for Sea Water Conversion Processes," pub. by Officer of Saline Water, Department of Interior, April 1956, pages 49–51.

"Saline Water Conversion Report for 1957," pub. by U.S. Department of Interior, January 1958, pages 49–50.

Weissberger: "Technique of Organic Chemistry," vol. III, part I, Interscience Publishers Inc., New York, 1956, pp. 713–718.

Ellis: "Fresh Water From the Ocean," Ronald Press Co., New York, 1954, pages 104–105.